Aug. 26, 1924.
L. B. NORDLUND
1,506,250
AUTOMATIC TICKET AND CHANGE RETURNING MACHINE
Filed July 5, 1922      5 Sheets-Sheet 1
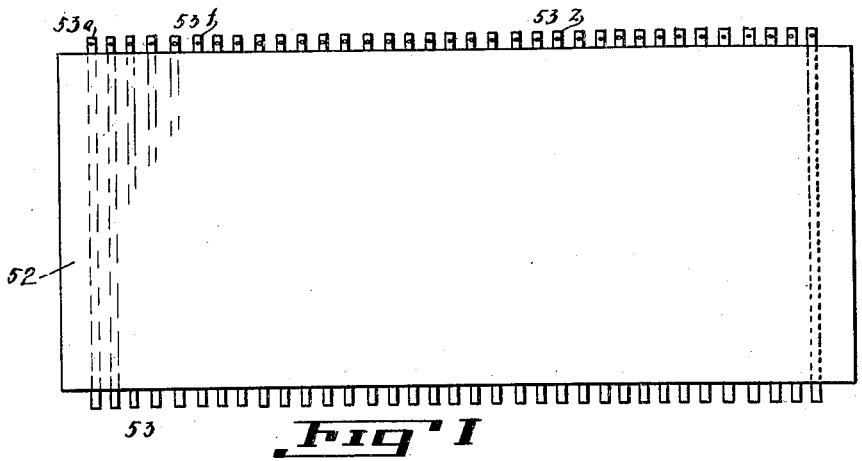
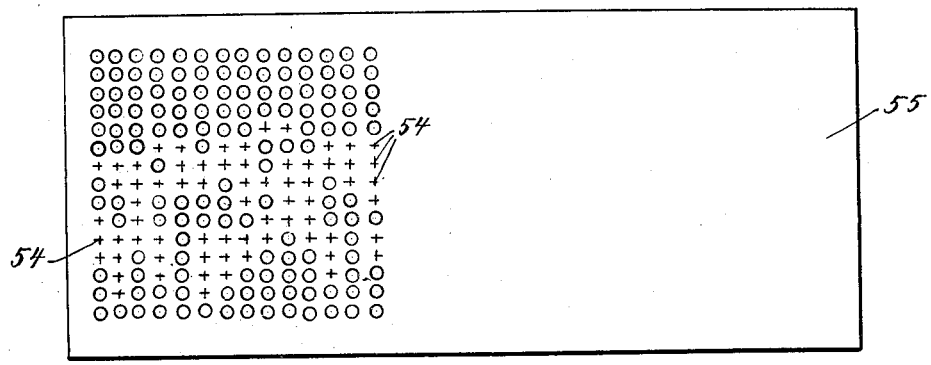
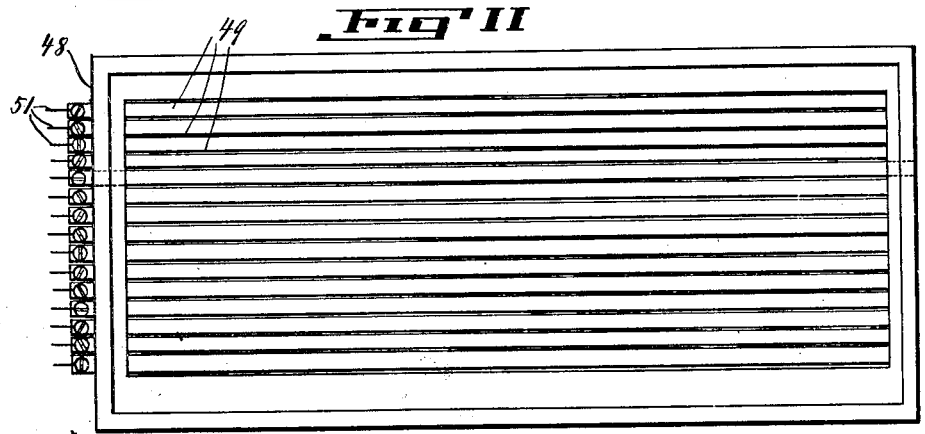
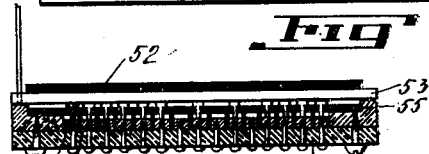
*INVENTOR*
*L.B.NORDLUND*
By
*ATTORNEYS*

Aug. 26, 1924.
L. B. NORDLUND
1,506,250
AUTOMATIC TICKET AND CHANGE RETURNING MACHINE
Filed July 5, 1922  5 Sheets-Sheet 2
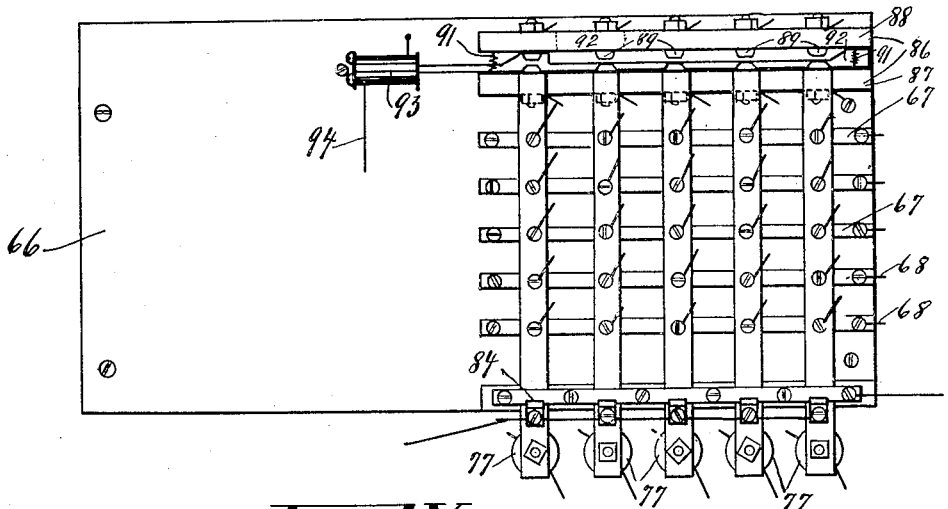
Fig. V
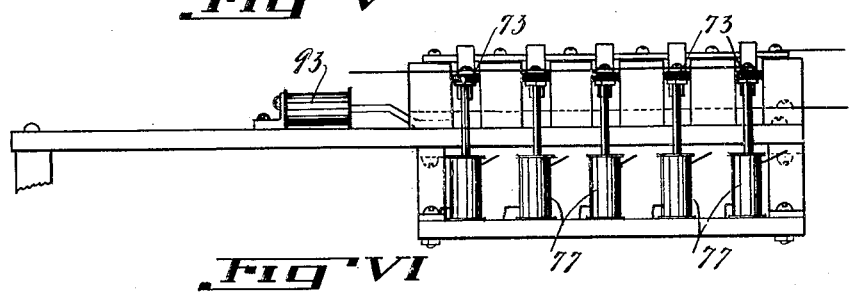
Fig. VI
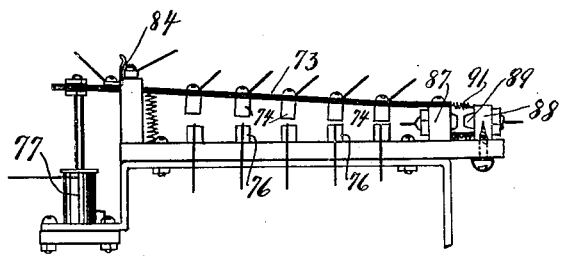
Fig. VII
INVENTOR
L.B. NORDLUND
BY
ATTORNEYS Aug. 26, 1924.
L. B. NORDLUND
1,506,250
AUTOMATIC TICKET AND CHANGE RETURNING MACHINE
Filed July 5, 1922   5 Sheets-Sheet 3
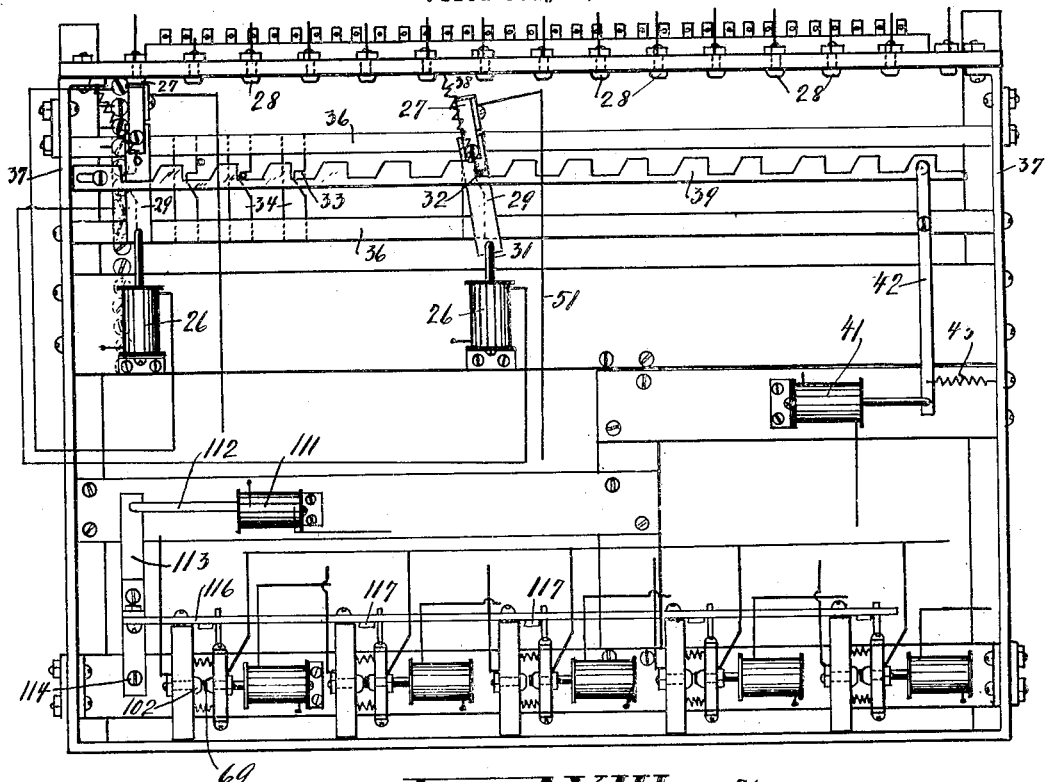
Fig. VIII
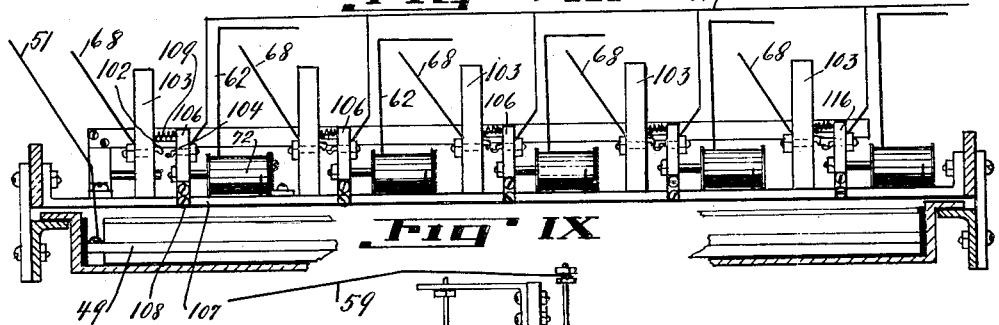
Fig. IX
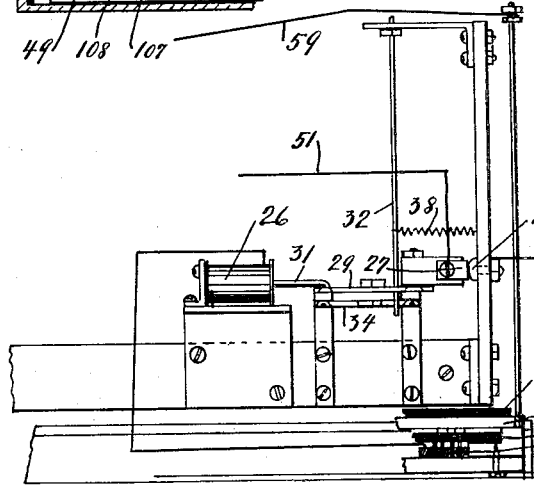
Fig. X
INVENTOR
L. B. NORDLUND
BY
ATTORNEYS

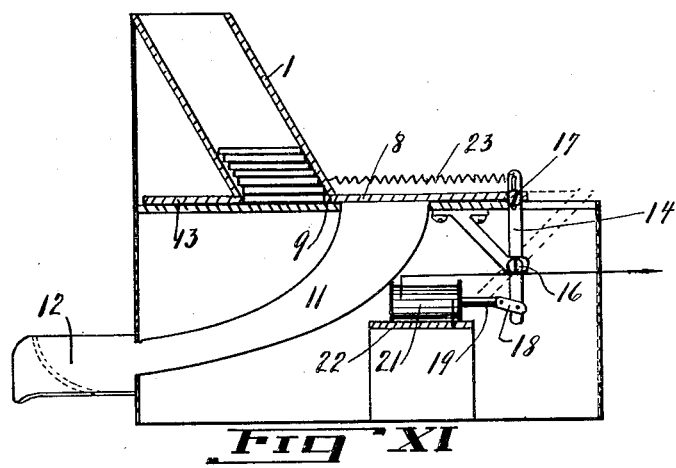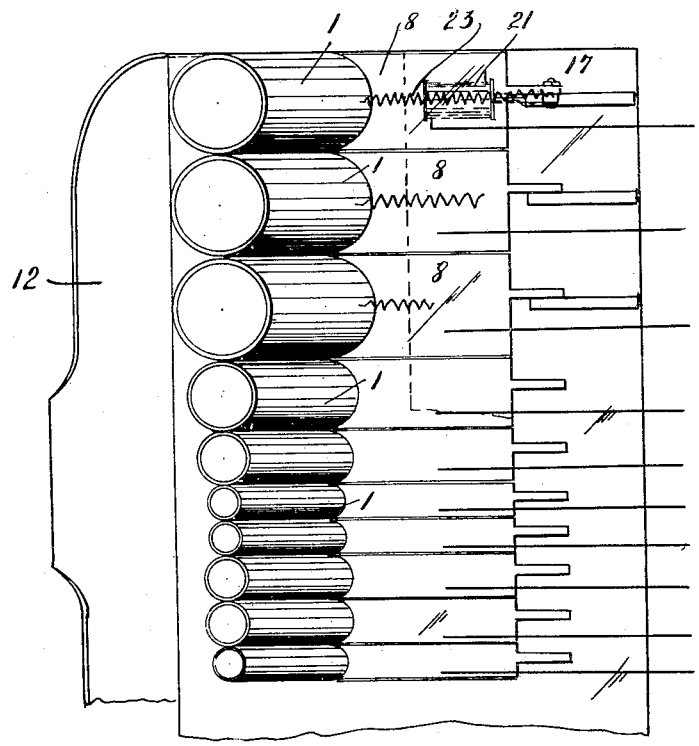

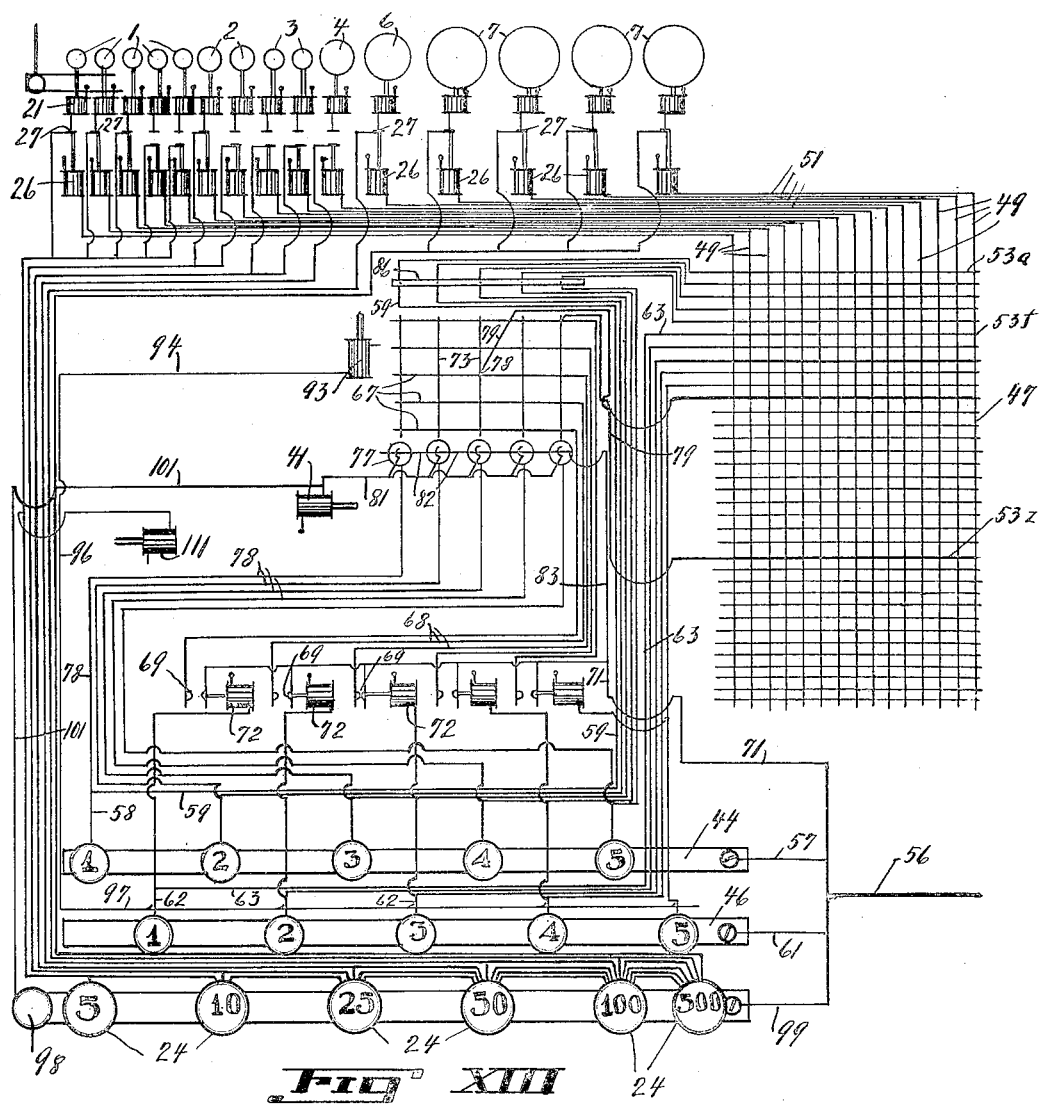

Patented Aug. 26, 1924.

1,506,250

UNITED STATES PATENT OFFICE.

LUDVIG B. NORDLUND, OF SAN FRANCISCO, CALIFORNIA.

AUTOMATIC TICKET AND CHANGE-RETURNING MACHINE.

Application filed July 5, 1922. Serial No. 572,824.

*To all whom it may concern:*

Be it known that I, LUDVIG B. NORDLUND, a citizen of the United States, and a resident of San Francisco, county of San Francisco, and State of California, have invented a new and useful Automatic Ticket and Change-Returning Machine, of which the following is a specification.

The present invention relates to improvements in automatic ticket and change returning machines and has particular reference to a machine adapted to be used in selling tickets at moving picture shows, theaters and the like, or in effecting a quick return of the change in restaurants, especially cafeterias. The principal object of the present invention is to provide an electrically operated machine that will allow the operator to cause the proper amount of change to be delivered by the machine by simply pressing a key. If, for instance, a patron desires to buy a ticket of the value of 13¢ and he hands to the operator a 50 cent coin, the latter need only press on certain key when the machine will automatically return the right amount of change, that is 37 cents, without requiring any figuring on the part of the operator. This operation is not confined, however, to the selling of a single ticket but may be used with the same ease in the selling of a plurality of tickets. If, for instance, the patron wishes to buy three tickets at 13 cents each, the operator need only press a key indicating that three tickets are wanted and another key indicating the value of the coin handed over by the patron when the machine will automatically return the proper amount of change, that is 11 cents.

In moving picture houses it is customary to sell tickets of different values as for instance, one ticket of the value of 7 cents and one of the value of 13 cents. It is proposed in the present invention to adapt the machine to also perform the function of selling tickets of different values. If, for instance, the patron wishes to secure three tickets at 13 cents each and three tickets at 7 cents each, making a total of 60 cents and he passes a dollar to the operator, the latter need only press the key indicating the number of tickets wanted of the different classes and a key showing the value of the coin passed and the machine will automatically return the change of 40 cents.

The general operating mechanism is substantially the same for the return of the change as for the delivery of the tickets. The drawings and the description have, however, been confined to an illustration of the change returning feature, it being understood that the general principle is adaptable to the delivery of the tickets and that protection is sought on general principles rather than on the particular device illustrated.

A further feature of the invention is the providing of certain exchange plates which allow the machine to be set for the different values of the tickets by the mere introduction of one exchange plate for another one so that for instance, when the machine is set for the use of tickets of 7 and 13 cents respectively and it is desired to change the prices to 12 and 21 cents, it is only necessary to substitute a new exchange plate for the one in the apparatus. It should be mentioned that in the following description an apparatus is illustrated that handles two different values of tickets only but the same general principles may be applied for the handling of the three or more different values of tickets.

The preferred form of the invention is illustrated in the accompanying drawing in which Figure (1) represents a plate of insulated material having a plurality of conductors secured thereto; Figure (2) an exchange plate; Figure (3) a device for holding a plurality of conductors; Figure (4) an assembly of the three details shown in Figures 1, 2 and 3 in cross section; Figure (5) a detail view in plan of a contact forming device; Figure (6) a front view of the same; Figure (7) a side view of the same; Figure (8) a top plan view of the main operative mechanism of my device with the plate shown in Figure (5) removed; Figure (9) a front view of the same partly in section; Figure (10) a side elevation of the same; Figure (11) a sectional detail view of the coin actuating mechanism; Figure (12) a top plan view of the same and Figure (13) a wiring diagram for the whole device. While I have shown only the preferred form of the invention, I wish to have it understood that various changes or modifications may be made within the scope of the claims hereto attached without departing from the spirit of the invention.

Referring to Figure (13) for the general arrangement and to Figures (11) and (12)

for the details it will be seen that a plurality of coin tubes are arranged in suitable order. The five tubes (1) at the left are designed to hold a stack of 1 cent pieces; the next tubes (2) are designed for nickels, the next tube (3) for dimes, the next one (4) for quarters and the next one (6) for half dollars and the next four (7) for one dollar coins. Leaving out of consideration for the time being, one of the dime stacks (3), it will be noticed that the coin tubes are arranged in such a manner that if one coin is taken from each, the sum of all preceding coins is equal to the total value of the next following coin of higher order. Thus, for instance, if one coin is removed from each of the coin stacks below the quarter stack (omitting the one dime tube referred to) an amount of 25 cents is represented. In a similar manner one coin taken from each of the tubes up to the tube (6) will represent the value of $1.00, that is, will equal the value of one coin removed from the first stack (7).

Coins may be withdrawn from the various tubes in the manner illustrated in Figure (11) from which it appears that a slide (8) is adapted to pass underneath the tube (1) containing a stack of coins, the slide being substantially of the same thickness as a coin and being provided with a perforation (9) in which the coin sets. If the slide is pulled forward it will separate the lowest coin from the others and advance the same so as to pass over the mouth of the coin delivery passage (11) through which the coin drops and is passed to the receptacle (12) from which it may be removed by the operator. The rear end of the slide moves underneath the stack of the remaining coins so that the latter will not be affected until the slide is returned to its original position, when another coin will drop into the perforation in the slide. The slide is operated by a lever (14) pivotally mounted as shown at (16) one end of which engages the slide through the pin (17) while the other end is engaged through a link (18) to the plunger (19) of a solenoid (21) supported on the standard (22). When the solenoid is energized the slide is moved forward and the return of the same is effected by the spring (23).

A key-board is provided in convenient reach of the operator with a number of keys (24) corresponding to the number of different coins employed, with one additional key for the total value of all the coins. In the example selected, for instance, one key is provided for the nickel tubes, and one for the dime tubes, one each for the quarter, fifty cent and dollar tubes and an additional one marked $5.00, the latter amount being the total of all the amounts represented by the preceding tubes. Each of these keys represents a switch, and the pressing down of the key closes the circuit controlled by the said switch. As will be seen from Figure (13) the five cent switch controls the five solenoids (21) associated with the one cent tubes, the ten cent key controls in addition thereto the solenoids (21) associated with the nickel tubes, the twenty five cent key in addition thereto the solenoids (21) associated with the dime tubes and so on, each key controlling all the solenoids associated with all the tubes containing coins of less value than that indicated on the key. Normally, therefore, if the fifty cent key is pressed the machine will return fifty cents leaving out of consideration the one dime tube which is provided for convenience only and which is taken care of by a provision referred to hereinafter.

When the operator receives a certain amount of money for the tickets to be bought, as for instance, a fifty cent piece, he presses on the fifty cent key. If he receives several coins, as for instance, a dollar piece, a fifty cent piece and a quarter, he presses on the key representing the lowest amount, in this case the twenty five cent key, it being understood of course that the amount of change is less than the value of the smallest coin handed to the operator. The function of the apparatus to be described in the following paragraphs is to prevent a certain number of the coin tube operating solenoids (21) from becoming operative so that no money is returned from those tubes. This amount thus withheld would correspond to the price of the ticket. If, for instance, the price of the ticket amounts to seven cents and a fifty cent piece is received by the operator, three of the solenoids (21), one associated with the nickel tube and two associated with the cent tubes would be rendered inoperative and if the fifty cent key is pressed only 43¢ instead of fifty cents would be returned.

To render certain coin returning solenoids (21) inoperative I provide an additional set of solenoids (26), each operating a switch (27) incorporated in the various circuits. All of these switches of which two are shown in detail in Figure (8) are normally closed. Each switch comprises a stationary contact (28) and a movable contact (29) secured to the end of the plunger (31) of the solenoid (26). When the latter is energized the contact is broken and a stud (32) rising from the movable contact is caught in a notch (33) of a stationary member (34) supported by the two longitudinal elements (36) secured in the frame (37), a spring (38) exerting a slightly lateral pull and forcing the stud into the notch so that the movable contact remains locked in this position until forced side-ways by a toothed bar (39). The latter is actuated at the proper time by a solenoid (41) through the lever (42), with a spring (43) opposing the tendency of the solenoid (41) and returning the bar (39) to its original position when the solenoid (41) is deenergized.

The switch operating solenoids (26) are controlled by means of the two rows of keys marked 1, 2, 3, 4 and 5 on the keyboard. To clearly illustrate the operation of the device it will be assumed that it is intended to use the same for the dispension of 7 and 14 cent tickets. The numerals shown on the respective keys correspond to the number of tickets of one kind to be sold, the upper row (44) controlling 7 cent tickets and the lower row (46) controlling the 14 cent tickets.

Referring to the upper row first, it will be seen that in the example selected for the purpose of this description, from one to five tickets of the same character may be sold at one time by pressing one of the five keys of the upper row. It stands to reason that the amount of money to be withdrawn from the change to be returned must vary in accordance with the number of tickets sold in one operation. If, for instance, the purchaser hands to the operator a fifty cent piece and desires only one ticket, 7 cents is to be withheld; if he wishes to buy two tickets 14 cents is to be withheld and so on. To withhold these respective amounts it is necessary to energize a corresponding number of the solenoids (26) and this is accomplished in the following manner: An exchange device (47) is provided as shown diagrammatically on the right hand side in Figure (13) and in detail in Figures 1 to 4. This device comprises a frame (48) in which are secured, separated from each other by proper insulating material, a plurality of longitudinal conducting rods (49) each being connected through wires (51) with one of the solenoids (26). Plate (52) of insulating material is disposed above the frame (48) and supports a plurality of transverse rods (53) which latter correspond in number to the possible number of different combinations that may arise, in the present case 35. This number is arrived at by adding the number of keys in both rows (in this case, 10) and the combinations between the keys of the two rows (in this case, 25). These transverse rods are connected with the keys on the key-board in the manner shown in Figure (13) and referred to hereinafter in detail. The transverse and the longitudinal rods are disposed in spaced relation to each other and have mounted between the same the exchange plate (55) shown in Figure (2). The latter is provided with a plurality of rows of studs (54), the number of rows corresponding to the number of the transverse rods (53) (that is 35 in this case) and the individual studs in each row which form contacts between the longitudinal rods and the transverse rods (53) corresponding in each case to the number and position of the switch operating solenoids (26) which have to be energized in order to withdraw the proper amount of money from the change returned.

The operation of the device thus far described may be more readily understood by referring to a simple example. Assuming the buyer wishes to buy one 7 cent ticket and hands the operator a fifty cent piece. The latter then presses the one ticket key of the upper row in the key-board which closes a circuit (see Figure 13) including the main line (56), the branch (57), the key contact, the wires (58) (59), the transverse rod (53ª) and through the studs (54) in the first row of the exchange plate a plurality of the wires (51) leading to various solenoids (26) and from there to the ground. From studying the first row of the exchange plate (55, Figure 2) it will be seen that two studs are provided corresponding in their relative position to two one cent coin tubes, one corresponding to a five cent coin tube and one corresponding to a ten cent coin tube so that altogether 17 cents are withheld from the change to be returned. It will be remembered that two dime tubes were provided instead of one and the stud for the ten cents is provided only for the purpose of compensating for the extra dime tube so that in reality instead of 17 cents only 7 cents are withheld from the fifty cents which would normally have been returned if the first key of the upper row had not been pressed. The amount returned therefore, when the fifty cent key is pressed is equal to 43¢. Assuming that the purchaser instead of giving to the operator a fifty cent piece had handed him a quarter, the same amount of 7¢ would have been withheld and the amount returned would equal 18¢.

If three tickets at 7 cents each were to be sold the key marked three in the upper row would be depressed and the third row of studs in the exchange plate (55) would become operative presenting a value of 31 cents, or after the deductions of the extra dime, a value of 21 cents which represents the price of three 7 cent tickets.

The lower row of keys (46) works substantially on the same principle as the upper row. If it is desired to sell one 14 cent ticket the key in the lower row marked 1 is depressed and a current caused to flow from the main line (56) through the branch (61), the key contact, the wires (62) (63), into the transverse rod (53f). The switch operating solenoids (26) corresponding to the studs shown in the row (f) of the exchange plate (55) would be energized and withhold a corresponding amount of money, which in this case would be 24 cents, allowing for the extra dime.

Further complications arise when it becomes necessary to sell tickets of two kinds in one operation. It will be readily seen that twenty five different combinations are possible considering that one 7 cent ticket may be sold in combination with 1, 2, 3, 4, or 5 14 cent tickets, two 7 cent tickets in combination with 1, 2, 3, 4 and 5 14 cent tickets and so on. To provide for these combinations I introduce the plate (66) with its contacts shown in detail in Figures 5 to 7 and diagrammatically in the central portion of Figure (13). On this plate which is made of insulating material are provided a plurality of transverse rods (67) connected at one end with the wires (68) which latter lead through five switches (69) to a branch line (71) of the main line (56). The switches (69) which are normally open are controlled by solenoids (72) which latter again are controlled by the key in the lower row (46) so that when one of the latter keys is depressed, it not only operates certain of the solenoids (26) individually but it also closes its respective switches (69) thereby connecting one of the rods (67) with the main line (56). During the operation previously described relative to the single key of the lower row, the closing of one of the switches (69) is without effect since the rods (67) normally have no further connections. The latter rods are surmounted by levers (73) which are disposed at right angles to the same and which are five in number corresponding to the five keys of the upper row. The levers (73) shown in detail in Figure (7) are provided with downwardly extending metallic studs (74) adapted to make contact with corresponding studs (76) of the transverse rods (67) when pulled downward by the solenoids (77). The latter are energized by depressing one of the keys of the upper row (44), the current coming in from the main line (56) and passing through the branch (57), the key contact, the wires (58) (78) and through the solenoid windings to the ground. Since five transverse rods are provided corresponding to the five keys of the lower row and five levers corresponding to the keys of the upper row there are altogether twenty five possible points of contact, only one of which is rendered operative by the simultaneous depression of two keys belonging to different rows. Assuming, for instance, it is desired to sell three 7 cent and three fourteen cent tickets calling for a price of 63 cents and a dollar is handed to the operator. The latter will then first press on the key marked three of the lower row thereby closing the central switch (69) as shown in Figure (13) and connecting the central one of the transverse rods (67) to the main line (56) through the branch (71) and one of the wires (68). Simultaneously or immediately thereafter the operator will depress the key marked three of the upper row thereby energizing the central one of the solenoids (77) and pulling its lever (73) downward. These levers make five contacts with the five transverse rods (67) but since only the central one of those rods is connected with the main line (56) the central contact only will become operative and a current will pass through said contact (78) and the wires (79) into the transverse rod (53*) of the general exchange arrangement. The studs on this rod energizing the various solenoids (26) are arranged to represent the value of 63 cents (or 73 cents if the extra dime is considered) and if now the dollar key is depressed the amount of 63 cents is withheld and the proper change amounting to 37 cents is returned.

It should be remembered, however, that each of the keys in each row performs a double function. Each key is not only adapted to co-operate with a key in the other row in closing one of the combination contacts but each key also operates individually if depressed by itself. This latter factor constitutes a disturbing element if co-operation of two keys of different rows is desired and provision must be made to eliminate the individual action of each key if co-operative action alone is desired. Referring in the last example to the lower key marked three, for instance, it will be remembered that depressing the same not only energizes the solenoid (72) thereby closing the switches (69) and connecting its respective transverse rod (67) with the main line (56) but also individually, through the wires (62), one of the wires (63) and the general exchange arrangement energizes a plurality of solenoids (26) corresponding in value to the amount of three 14 cent tickets. Since this does not represent the amount which should be withdrawn in the combination operation, the work done individually by this key must be undone to obtain correct results. For this purpose I use the solenoid (41) previously mentioned which controls the resetting (39) and the winding of which is connected with the main line (56) through the wires (81, 82, 83 and 71). This circuit is controlled by a switch (84) associated with each lever (73) as shown in detail in Figure (7) and in the wiring diagram and is normally open but is momentarily closed when the lever (73) is pulled downward by the solenoid (77) so that during that operation the solenoid (41) becomes momentarily energized and resets the whole mechanism, thereby undoing the result of the individual action of the lower key marked (3).

The upper key marked (3) also has a dual function, one being its individual function and the other one its co-operative function. If the latter is desired, its individual function must be eliminated since it would constitute a disturbing factor. For this purpose I introduce into the individual circuits controlled by the upper row of keys the switch arrangement (86) shown in detail in Figures 5 to 7 and comprising a stationary member (87) having five contacts thereon corresponding to the five circuits and a movable member (88) having five corresponding contacts (89). These two switch members are normally forced together by means of springs (91) but may be separated from each other so that all the contacts are broken by the wedge (92) operated by the solenoid (93). The latter is electrically connected through the wires (94, 96 and 97) and the lower key contacts with the main line (56) so that when anyone of the lower keys is depressed the solenoid (93) is energized and all the individual circuits of the upper keys are interrupted and rendered inoperative.

Briefly stated the combined operation of two keys is therefore as follows: A key of the lower row is depressed performing three functions. It firstly closes the contact (69) by energizing the solenoid (72) and thereby connects one of the transverse rods (67) into the branch line (71), it secondly performs its individual function of withdrawing a certan amount of money corresponding to its individual character and thirdly it energizes the solenoid (93) thereby preventing the key of the upper row from performing its individual function. A key of the second row is then depressed and performs the following functions: It energizes one of the solenoids (77) and thereby pulls down the lever (73). While coming down this lever closes the contact (84) and energizes the solenoid (41), which resets the whole apparatus thus undoing the result of the action of the lower key in its individual capacity and thereafter closes one of the twenty five combination contacts thereby energizing those of the solenoids (26) which withhold an amount of money corresponding to the price of the tickets.

To reset the device after the operation is performed the individual key (98) is depressed and closes the contact in the branch line (99) connecting through the wire (101) with the winding on the solenoid (41) which thereupon actuates the bar (39), in the manner previously described.

The particular construction of the switches (69) is shown in Figures (8 and 9). They comprise a stationary contact (102) supported in the bar (103) and a movable contact (104) supported in the member (106) pivotally secured to a frame member (107) as shown at (108). The contact (102) is slightly bent as shown in Figure (8) and the contact (104) is made of spring material and provided with a recess adapted to receive the nose of the contact (102). The member (106) bearing the movable contact is actuated by the plunger of the solenoid (72) and is engaged by the nose of the contact (102) when the solenoid is energized. The two contacts remain engaged due to their particular construction, even if the solenoid is deenergized, the spring (109) not being sufficiently strong to break the engagement. To perform the latter act it is necessary to energize the solenoid (111) which through its plunger (112) actuates a lever (113) pivotally secured in the frame as shown in (114) and a transverse bar (116) secured to a central portion of the lever, which latter is provided with a projection (117) for each movable contact holding member (106). When the solenoid is energized the lever (113) is pulled to the right, as viewed in Figure (8) and the transverse bar (116) follows this motion thereby breaking any contact that may have been established during the operation. As shown in Figure (13) the solenoid (113) is energized whenever any one of the coin keys (24) is depressed.

I claim:

1. In a device of the character described, a plurality of circuits, two groups of switches, and connecting means between the circuits and the switches allowing each switch to control a certain combination of circuits and allowing any one of the switches of one group to co-operate with any one of the switches of the other group in controlling certain additional combinations of the circuits.

2. In a device of the character described, a plurality of circuits, two groups of switches, and connecting means between the circuits and the switches allowing each switch to control a certain combination of circuits and allowing any one of the switches of one group to co-operate with any one of the switches of the other group in controlling certain additional combinations of the circuits, rendering the individual switches inoperative in the latter case.

3. In a device of the character described, a plurality of circuits, a plurality of groups of switches, and connecting means between the circuits and the switches allowing each switch to control a certain combination of circuits and allowing any one of the switches of one group to co-operate with any one of the switches of another group in controlling certain additional combinations of the circuits.

4. In a device of the character described, a plurality of circuits, a plurality of groups of switches, and connecting means between the circuits and the switches allowing each switch to control a certain combination of circuits and allowing any one of the switches of one group to co-operate with any one of the switches of another group in controlling certain additional combinations of the circuits, rendering the individual switches inoperative in the latter case.

5. In a device of the character described, a plurality of circuits, a plurality of switches and means for controlling varying combinations of circuits through said switches comprising conducting rods associated with the circuits, conducting rods associated with the switches disposed transversely to the former and a plate interposed between the two sets of rods having a row of conducting studs for each of the latter rods establishing connections with a combination of the former rods.

6. In a device of the character described, a plurality of circuits, a plurality of switches and means for controlling varying combinations of circuits through said switches comprising conducting rods associated with the circuits, conducting rods associated with the switches disposed transversely to the former and a plurality of exchange plates adapted to be exchangeably interposed between the two sets of rods each having a row of conducting studs for each of the latter rods establishing connections with a combination of the former rods.

7. In a device of the character described, a plurality of circuits, a plurality of switches and means for controlling varying combinations of circuits through varying combinations of switches comprising conducting rods associated with the circuits, conducting rods associated with the switches disposed transversely to the former and a plate interposed between the two sets of rods having a row of conducting studs for each of the latter rods establishing connections with a combination of the former rods.

8. In a device of the character described, a plurality of circuits, a plurality of switches and means for controlling varying combinations of circuits through varying combinations of switches comprising conducting rods associated with the circuits, conducting rods associated with the switches disposed transversely to the former and a plurality of exchange plates adapted to be exchangeably interposed between the two sets of rods each having a row of conducting studs for each of the latter rods establishing connections with a combination of the former rods.

LUDVIG B. NORDLUND.